May 21, 1929.　　　　　L. E. WHITON　　　　　1,713,805
CHUCK
Filed April 26, 1928　　　3 Sheets-Sheet 1

INVENTOR.
Lucius E. Whiton
BY
ATTORNEY

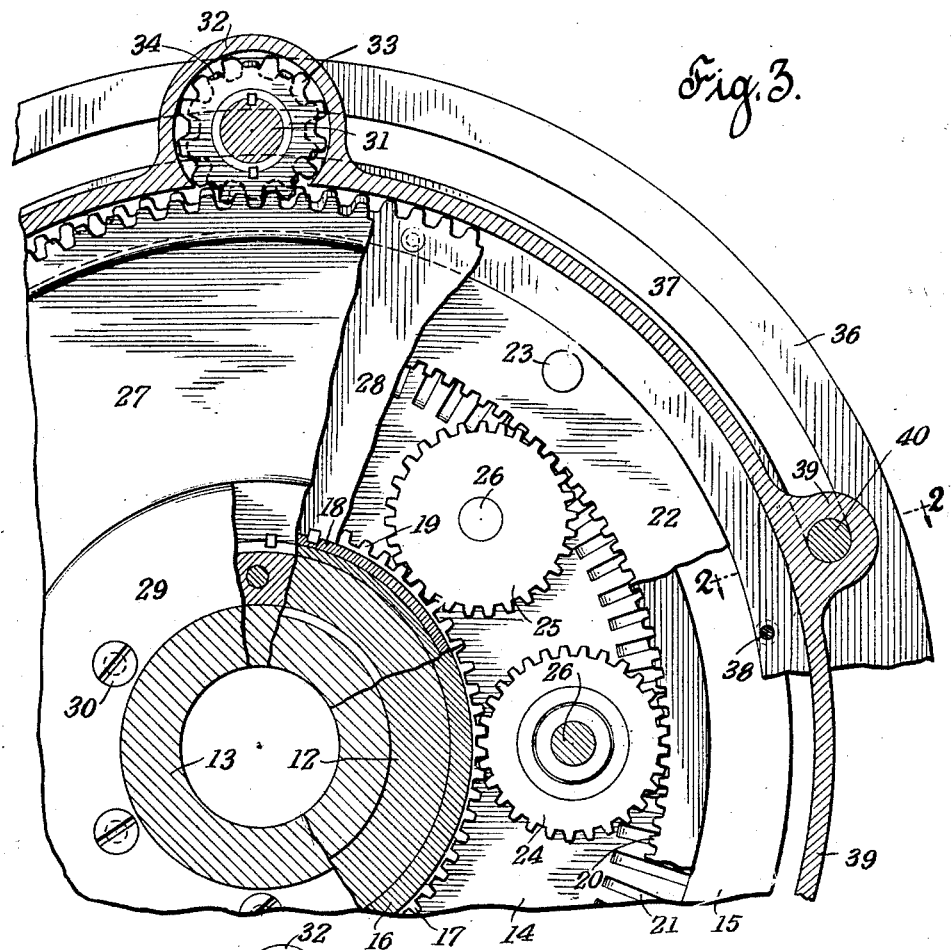
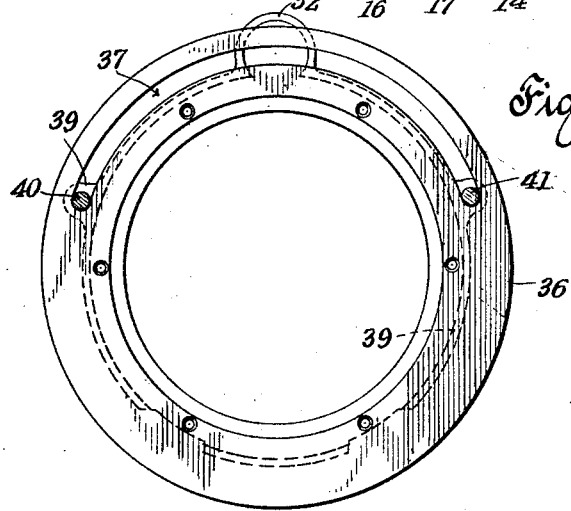
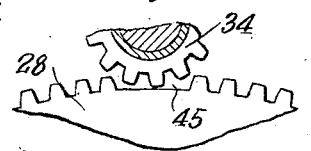

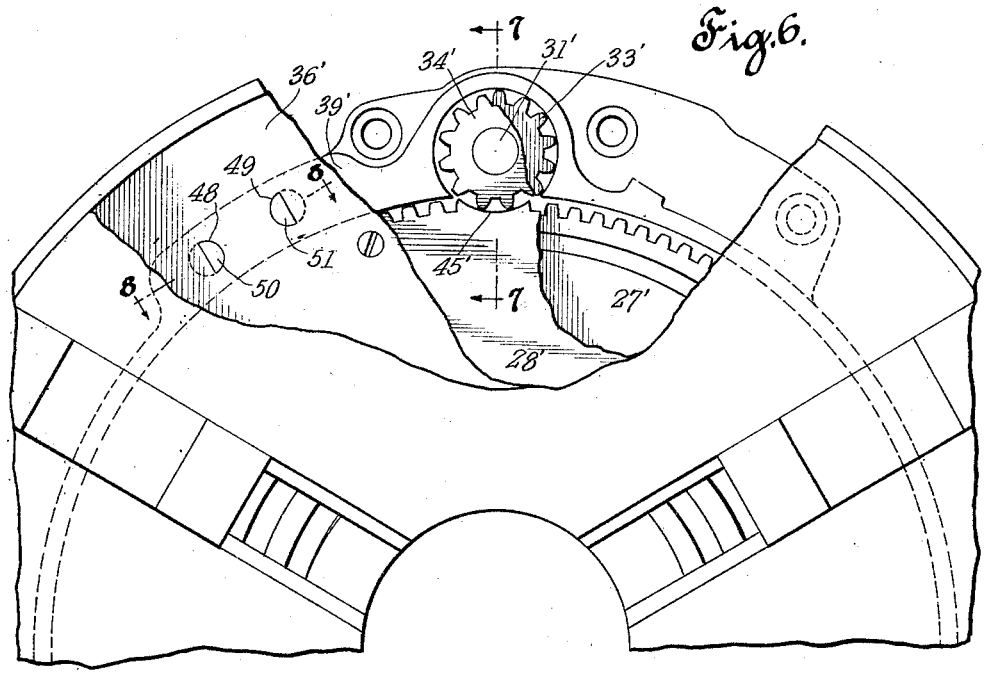
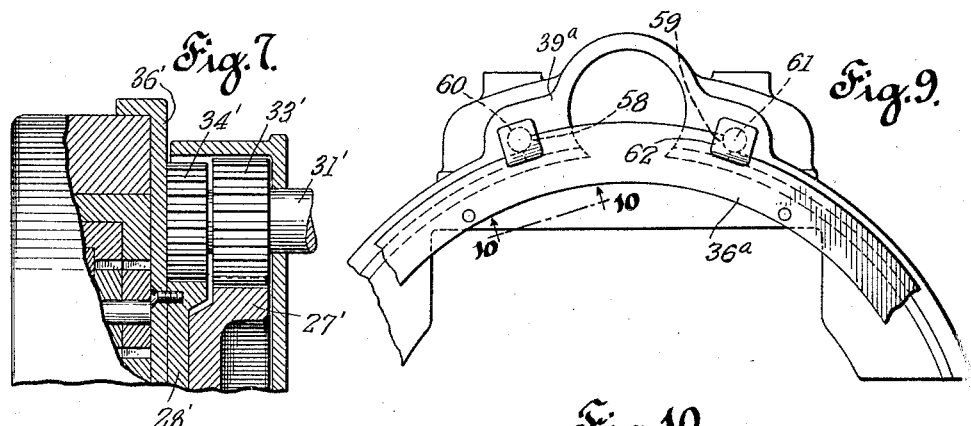
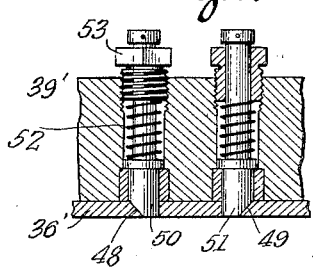
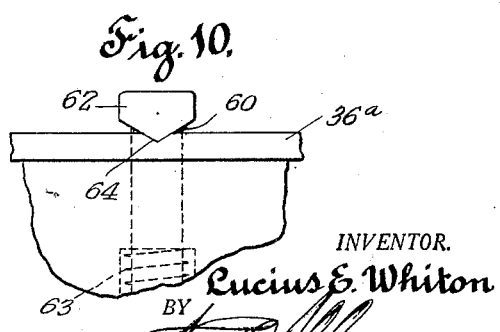

Patented May 21, 1929.

1,713,805

UNITED STATES PATENT OFFICE.

LUCIUS E. WHITON, OF NEW LONDON, CONNECTICUT.

CHUCK.

Application filed April 26, 1928. Serial No. 272,973.

My invention relates particularly to lathe chucks in which the work gripping jaws are adjustable while the chuck is rotating.

The main object is to provide a construction of this type in which the jaws may be moved rapidly when approaching the work to be gripped and in which the speed of movement will be automatically slowed up when the jaws meet the resistance of the work. In other words, I desire to automatically increase the power factor when the jaws grip the work.

Another object is to provide a chuck of this type which can be mounted on a hollow spindle leaving the central space clear so that rods, bars or tools can be fed through the spindle.

Another object is to provide a chuck of this character which is compact and durable.

The present invention constitutes an improvement upon constructions set forth in applications previously filed by me particularly in regard to differential mechanism provided with automatic power factor changing means. The improvements contemplate the use of two driving wheels or adjusting members connected with the chuck body and jaw operating scroll plate by means of a planetary gear train. This gear train is housed within the chuck body between one of the adjusting members and the scroll plate. The adjusting members are adapted to be driven by pinions on a common shaft which shaft can be turned either by hand or by power. The gear ratios of the pinions and respective adjusting gears are slightly differnt one from the other so as to produce a differential movement between the adjusting members when they are both being driven. One of the adjusting members, however, has some of its teeth cut away or omitted and means are provided for holding that adjusting member stationary during the non-gripping period of the jaw adjustment. As the jaws meet the resistance of the work or stock the previously stationary adjusting member is automatically dragged around against frictional resistance until its teeth engage the companion pinion whereupon both adjusting members are driven positively but at different speeds so that the difference in the movement of the two adjusting members is communicated to the jaw actuating plate at slow speed so as to produce a greatly increased power factor.

Fig. 3 is a rear view and partial section, parts being broken away to show the interior mechanism.

Fig. 4 is a detailed front view of the friction ring or plate with the stop pins in section.

Fig. 5 is a fragmentary detailed view showing parts of one of the adjusting members and its driving pinion.

Fig. 6 is a fragmentary front view of a modification.

Fig. 7 is a transverse sectional view on the plane of the line 7—7 of Fig. 6.

Fig. 8 is a sectional view on the plane of the line 8—8 of Fig. 6.

Fig. 9 is a fragmentary front view of another modification.

Fig. 10 is a view on the plane of the line 10—10 of Fig. 9.

Figures 1, 2:
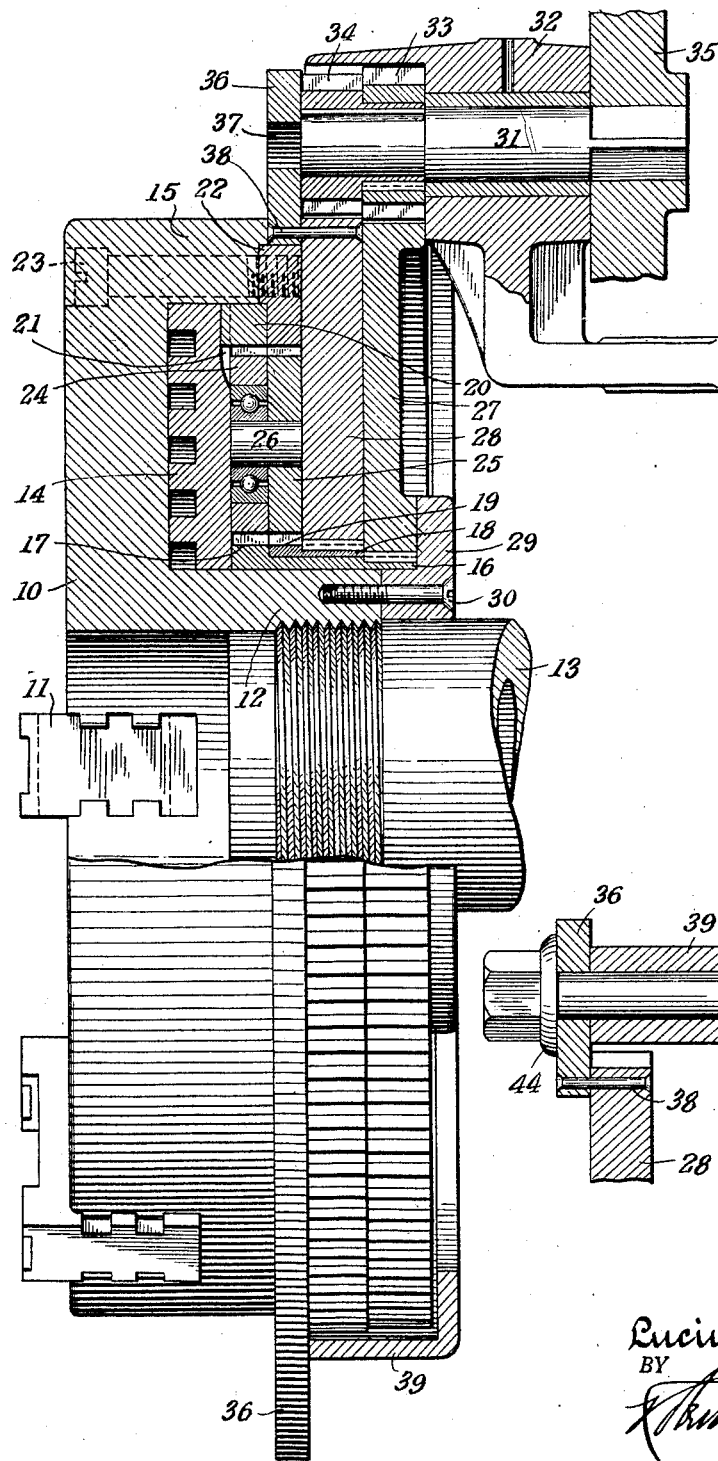
Fig. 1 is a vertical sectional view and side elevation of one form of apparatus embodying my invention.
Fig. 2 is a similar sectional view and side elevation of one of the friction devices.

The chuck body 10 may be of any suitable construction and provided with the usual guideways for the jaws or jaw bases 11. The chuck body preferably has an integral hub 12 adapted to be screwed on to the end, or other wise suitably attached to the hollow spindle 13. The jaws are adapted to be moved radially by means of any suitable form of adjusting plate 14 preferably in the form of a cam or scroll plate which is mounted on the hub 12 within the flange 15.

The inner sleeve 16 mounted on the hub 12 is provided on its inner end with teeth 17 forming a spur gear. The outer sleeve 18 mounted on the sleeve 16 is provided with gear teeth 19 forming an outer spur gear which is a companion to and arranged along side of the spur gear 17. An annular gear 20 is mounted within the flange 15 of the chuck body and has teeth facing inwardly toward the teeth of the spur gear 17. This gear ring 20 has a series of clutch teeth in engagement with corresponding teeth 21 on the back of the scroll plate 14 so that the two parts are separable but when in place must rotate together. Another ring 22 has teeth facing toward the spur gear 19 and is secured to the flange 15 of the chuck body in any suitable manner, as for instance, by means of machine screws 23. Between the spur gears and annular gears above referred to are mounted a number of pairs of planetary pinions 24 and 25, the pinions of each pair being mounted on a stud or shaft 26 so that the pinions of each pair may rotate with respect to each other on the stud 26 but must travel together around the axis of the chuck between the spur gears and annular gears.

At the back of the chuck are two discs 27 and 28 which are keyed respectively to the sleeves 16 and 18 and held in place by the ring 29 and screws 30. The planetary pinions 24 and 25 travel around between the inner and outer gears, being held in place between the disc 28 and the scroll plate 14.

A countershaft 31 is mounted in a stationary bracket or housing 32 and has keyed to it directly or indirectly two pinions 33 and 34. The discs 27 and 28 are provided with teeth so that they constitute gear wheels in mesh respectively with the pinions 33 and 34. The gear ratio, however, between the respective gear wheels and pinions differ slightly, for instance, pinion 33 may have thirteen teeth and pinion 34 ten teeth whereas gear wheel 27 has ninety-one teeth and gear wheel 28 has ninety-four teeth so that the gear ratios are respectively 13/91 and 10/94. The pinion shafts may be driven in any suitable manner as for instance by means of a hand or power wheel 35.

An annular plate or ring 36 provided with an arcuate slot 37 is secured to the gear wheel 28 in any suitable manner for instance by means of rivets 38. A stationary flange or housing 39 surrounds the gear wheels 27 and 28 and preferably affords a lateral bearing for the plate 36. Suitable pins 40 and 41 supported in the housing 39 extend through the slot 37 in the plate 36. Each of these pins has mounted upon it a spring 42 which presses against the housing 39 and against the head 43 so as to draw the other head 44 up against the plate 36. Midway between the pins 40 and 41 the gear wheel 28 is cut away at 45 so that the teeth of the pinion 34 do not mesh with the gear wheel 28 in this position.

In the ordinary operation of the chuck the countershaft 31 and the gear wheels 27 and 28 are stationary while work is being done. This means that the sleeves 16 and 18 and the corresponding gears 17 and 19 are also stationary. The chuck body is of course being rotated by the spindle 13 or other means so that the scroll plate 14 and the associated annular gears 20 and 22 rotate together around the axis of the chuck. This causes the planetary pinions 24 and 25 to travel idly around between the discs 28 and 14. When it is desired to adjust the jaws the countershaft 31 is rotated. The pinion 33 then rotates the gear wheel 27 and the spur gear 17 relative to the spur gear 19. This relative movement of the gears 17 and 19 causes relative movement of the pinion 24 with respect to pinion 25 and consequently a relative movement of the annular gear 20 with respect to gear 22 so that the scroll plate 14 rotates relatively to the chuck body and moves the jaws in or out as the case may be.

By removing one of the stop pins 40 or 41 it is apparent that the gear wheel 28 is free to rotate through an angle corresponding to the arc of the slot 37 except for the friction created between the plate 36 and the housing 39 and the friction between the head 44 and the plate 36. As soon, however, as the jaws meet sufficient resistance to overcome this friction the gear wheel 28 will be dragged around until its teeth engage the teeth of the pinion 34 whereupon the gear wheel 28 will be driven at the same time with the gear wheel 27 but at a different speed determined by the difference in gear ratios above described. From this time on the action is differential and with greater power as the work is being gripped by the jaws. When the jaws are backed away from the work the action is the reverse being at first slow as the gripping pressure is released and then rapid while the jaws are being cleared away from the work passage.

The operation of the parts after the pinion 34 has been brought into engagement with the teeth on the adjusting gear 28 may perhaps be best explained as follows.

As before stated, when the jaws are in adjustment and the chuck is in operation, the chuck body, scroll plate, and ring gears 20 and 22, all rotate together, there being no relative rotation between these respective parts. The parts 16 and 18 remain stationary and the pinions 24 and 25 of course revolve about the axis of the spindle as they rotate with equal speed about the common stud 26 between the ring gears 20 and 22, and the teeth 17 and 19.

If the sleeves 16 and 18, and consequently the sets of teeth 17 and 19, were now rotated at equal speeds, the relative rotation of the gears 20 and 22 would not be affected at all. Only a relative translation of the pinions 24 and 25, and their common stud 26 about the axis of the spindle would take place, for as a matter of fact the gears 20 and 22 could well remain stationary while the sleeves 16 and 18 were rotated at equal speeds if it were so desired.

When the pinion 34 is brought into engagement with the teeth on the adjusting gear 28 and rotated, however, the sleeve 18 is rotated at a slower speed than the sleeve 16 is rotated due to the relative gearing ratios of the pinions 34 and 33. This movement of the sleeves 16 and 18 tends to displace the positions of the pinions 24 and 25 in their orbit about the axis of the spindle as pointed out above but since the movement of sleeve 16 will be greater than that of sleeve 18 the pinion 24 will have a greater tendency for displacement than pinion 25. The two pinions are mounted on a common shaft, however, so there can be no displacement of the one without the other and the total displacement of the two will be equal to only the displacement of pinion 25. The ring 20 will therefore have to move relative to the gear 22 an amount sufficient to compensate for the difference in relative rotation of the pinions 24 and 25. Since the ring 20 is attached to the scroll plate and ring 22 is bolted to the chuck body, relative rotation of the chuck body and scroll plate will be effected and a corresponding adjustment of the jaws will accordingly take place.

It will be understood of course that although I may provide two of the stop pins or studs 40 or 41 that ordinarily only one of them will be used depending upon whether the jaws are to grip the work when moving inwardly or when moving outwardly.

Of course in case only the low power factor rapid movement is desired both of the bolts or stop pins 40 and 41 will be used. This low power factor movement is sufficient for holding light work which might be distorted or injured by a higher power factor.

It should be understood that various changes in details may be made without departing from the spirit or scope of my invention. Some of the claims, however, refer generally to the members 27 and 28 as adjusting gears since they move with respect to each other and with respect to the chuck body for varying the movement of the gripping jaws while the chuck is rotated. The differential mechanism of the claims includes the two adjusting gears, the countershaft, and the pinions mounted on it. The planetary train or gears includes the inner spur gears and the outer annular gears together with the intervening pairs of pinions. It will be understood of course that the invention broadly is not limited to the particular type of planetary train herein shown, although that is preferred for simplicity, compactness, and reliability together with ease of assembly and replacement.

In the form shown in Figs. 6, 7 and 8, the gears 27' and 28' are mounted in the stationary housing or support 39' and driven differentially by the pinions 33' and 34' respectively on the shaft 31'. The plate 36' secured to the gear 28' has recesses 48 and 49 for the bevelled ends of the pins 50, 51. Each pin is pressed toward the plate 36' by a spring 52 and adjusting nut 53 (Fig. 8) so that normally the gear 28' and plate 36' are locked stationary by the pins 50 and 51. Consequently the rotation of the pinions 33' and 34' rotates only gear 27' at a maximum speed and minimum power factor since the gear 28' is cut away at 45' and hence can not be rotated. If either pin 50 or 51 is retracted the plate 36' and gear 28' is allowed to turn when the power applied in one direction is sufficient to overcome the pressure of the bevelled end of the other pin—thus resulting in a differential rotation of the two gears and a resulting increased power factor. By withdrawing both pins the jaw movement may be slow inwardly as well as outwardly so as to ensure maximum power factor at all times. This construction is adapted to larger chucks where it is desirable to have access to the pins 50 and 51 from the back.

In the form shown in Figs. 9 and 10 the member $36^a$ is secured to the gear 28 (not shown) and has shoulders 58 and 59 to serve as abutments for the pins 60 and 61 which have heads 62 drawn toward the plate $36^a$ by springs 63. Each head has a wedge shaped part 64 which fits yieldingly in a corresponding notch in the edge of the plate $36^a$. These pins 60, 61 are adapted to be retracted when high power factor is required. On account of the shoulders 58 and 59 being between the pins the duration of the high power factor (about 320°) is much greater than in the form shown in Figs. 1 to 4 where the ends of the slot 37 are only about 120° apart and consequently permit only 120° of high power factor movement. As the ends of the bolts or pins 60, 61 are wedge shaped therefore when the jaws contact with the work after the rapid movement ceases, the reaction must slightly compress the spring 63 after which the plate $36^a$ revolves differentially as above described with reference to form one. This form also is adapted to chucks of larger diameter. By the term "power factor" as used herein we mean the relative speed of rotation of the counter shaft 31 with respect to the radial movement of the jaws. The increase of power factor occurs when the gear ratio is changed by the interengagement of the pinion 34 and the gear 28 and the power factor is decreased when the gear 28 is released for the pinion 34.

I claim:

1. Chuck jaw adjusting means comprising two coaxial gear wheels and coaxial pinions geared thereto at different ratios, means for moving the jaws upon rotation of the wheels, a slotted member connected to one wheel, frictional means for retarding said member and a stop for said member co-acting with the slotted member, a portion of the teeth on one wheel being cut away to prevent it from being driven when said slotted member is held by said stop.

2. A lathe chuck comprising a body having jaws for engaging work, means for moving said jaws including two gears on the chuck axis and two pinions meshing therewith but having different pitch ratios, a single shaft for said pinions, means for holding one gear stationary while the other gear rotates, and means actuated by the resistance which the work offers to the adjustment of the jaws to actuate and thereby connect said stationary gear to its pinion.

3. A lathe chuck comprising a body having jaws, means for operating the jaws according to two different power factors while the body rotates including a planetary gear train and means actuated by the resistance of the article when gripped for automatically changing from one power factor to the other.

4. A chuck body having jaw guiding means, a jaw adjusting member associated therewith, two adjusting gear wheels, driving pinions therefor having different gear ratios, one gear wheel having a portion of its driving edge cut away adjacent its pinion, means for limiting the rotation of said latter wheel relative to the other wheel, a planetary gear train between said adjusting gear wheels and said body and said adjusting member, and means for frictionally retarding the movement of the gear having the cut-away edge.

5. A chuck body having jaw guiding means, a jaw adjusting member associated therewith, two adjusting gear wheels, driving pinions on a single shaft co-acting with said gear wheels and having different ratios with respect thereto, a planetary gear train between said adjusting gear wheels and said jaw adjusting member including pairs of pinions guided between one adjusting gear wheel and the jaw adjusting member, one gear wheel having a portion of its driving edge cut away adjacent its pinion, and means for preventing the rotation of said latter wheel.

6. A chuck comprising a body, jaws movable therein, a jaw actuator, a planetary gear mechanism for driving said actuator relative to the body including two gear members, means for driving one of said gear members, stop means for holding the other gear member stationary while the first mentioned gear member is rotating relative thereto, and automatically operable means for rotating the second mentioned gear member with respect to the first mentioned gear member when the jaws meet a predetermined resistance so as to automatically reduce the rate of movement of the jaws.

7. A chuck comprising a body, jaws mounted to move therein, means for moving said jaws with respect to the body, said means including two gear members, means for driving one gear member while the other is relatively stationary so as to move said jaws with a certain power factor, means for driving the other gear member at a materially different rate from the first mentioned gear member, and means actuated automatically by the resistance which the jaws meet in gripping the work for bringing the second driving means into action.

8. A chuck comprising a body, jaws movable therein, a planetary gear train for moving the jaws in the body, said train including two gear members, a movable stop member for holding one gear member stationary, means for driving the other gear member, means for driving the first mentioned gear member when the stop member is disengaged, and frictional means actuated by the resistance which the work presents to the movement of the jaws for bringing the second mentioned driving means into action to materially change the power factor.

9. A chuck comprising a body, jaws movable therein, a planetary gear train for moving the jaws in the body, two gear members for driving said train, a pinion for driving each gear member, and means for holding one gear member stationary while the other gear member is rotating, said pinions being mounted to rotate together and the driving edge of one gear member having a cut-away portion permitting its pinion to rotate without rotating the companion gear member.

LUCIUS E. WHITON.